United States Patent [19]

Kolessar

[11] Patent Number: 5,408,258

[45] Date of Patent: Apr. 18, 1995

[54] METHOD OF AUTOMATICALLY QUALIFYING A SIGNAL REPRODUCTION DEVICE FOR INSTALLATION OF MONITORING EQUIPMENT

[75] Inventor: Ronald S. Kolessar, Columbia, Md.

[73] Assignee: The Arbitron Company, Columbia, Md.

[21] Appl. No.: 50,886

[22] Filed: Apr. 21, 1993

[51] Int. Cl.⁶ .............................................. H04K 1/00
[52] U.S. Cl. ...................................... 348/5.5; 380/10; 380/23; 455/26.1; 348/2
[58] Field of Search ...................... 348/5.5, 2; 380/10, 380/16, 23; 307/202.1; 455/26.1; 368/9

[56] References Cited

U.S. PATENT DOCUMENTS

| | | |
|---|---|---|
| 2,855,993 | 10/1958 | Rahmel ................................. 368/9 |
| 3,126,513 | 3/1964 | Kamen . |
| 3,483,327 | 12/1969 | Schwartz ............................... 455/2 |
| 3,879,332 | 4/1975 | Leone ............................. 348/5.5 X |
| 3,947,624 | 3/1976 | Miyake . |
| 4,058,829 | 11/1977 | Thompson . |
| 4,348,696 | 9/1982 | Beier ............................... 348/5.5 X |
| 4,718,107 | 1/1988 | Hayes ............................. 455/26.1 X |
| 4,816,904 | 3/1989 | McKenna et al. . |
| 4,912,552 | 3/1990 | Allison et al. . |
| 4,956,825 | 9/1990 | Wilts ...................................... 368/9 |
| 4,985,761 | 1/1991 | Adams . |
| 5,051,837 | 9/1991 | McJunkin ....................... 348/5.5 X |
| 5,168,372 | 12/1992 | Sweetser ............................. 348/5.5 |
| 5,191,231 | 3/1993 | Berry ................................. 307/202.1 |

Primary Examiner—Tod R. Swann
Attorney, Agent, or Firm—Eugene L. Flanagan, III; Curtis, Morris & Safford

[57] ABSTRACT

A method and system for automatically qualifying a signal reproduction device for installation of monitoring equipment. In a household in which viewing patterns are to be monitored, for example, a relatively inexpensive and simple set usage device is installed in proximity to a television set which is expected to receive little or no use. Times when the set is in use are sensed, and data concerning those times are stored and transmitted to a central location. At the central location, the times represented by the transmitted data are compared to a minimum usage threshold, and a more sophisticated monitoring device, able to detect the channel tuning state of the T.V. set, is installed in proximity to the T.V. set only if the usage of the T.V. set exceeds the minimum usage threshold. The number of relatively expensive and complex tuning-monitoring devices required to be installed is thereby reduced.

29 Claims, 3 Drawing Sheets

METHOD OF AUTOMATICALLY QUALIFYING A SIGNAL REPRODUCTION DEVICE FOR INSTALLATION OF MONITORING EQUIPMENT

FIELD OF THE INVENTION

This invention relates to monitoring usage of signal reproduction devices, such as television receivers, video monitors and the like, and radio receivers, and is more particularly directed to a method and apparatus for automatically determining whether it is desirable to install or maintain monitoring equipment with respect to a given device.

BACKGROUND OF THE INVENTION

It is generally known that electronic systems are provided for automatically gathering data concerning television viewing habits for such purposes as program ratings, market research and the like. Such systems, some of which are referred to as "tuning people meters", typically include a capability for determining a source, such as a broadcast channel, of the programming reproduced by the television set, as well as the composition of the audience.

As market requirements for such monitoring devices have developed, the gathering of more data, and more complex data, concerning television viewing has been demanded, and it has also been found to be desirable to make the monitoring devices as easy to use, and as transparent to the viewer, as possible. These developments, and the resulting evolution of monitoring equipment, has caused such equipment to become increasingly complex and somewhat expensive.

At the same time, the average number of television sets per household has in general increased. In order to assure accurate data gathering with respect to the viewing habits of members of a household, it has usually been the practice to install a monitor in association with each television set in the household. However, it is believed that in a significant number of households in which monitoring equipment is installed, one or more of the television sets therein are seldom if ever used. In such cases, it would be desirable to avoid installation of a monitor with respect to the little used television set or sets without compromising the accuracy of the television viewing data that is to be gathered for that household.

OBJECTS OF THE INVENTION

It accordingly is an object of the invention to provide a method and apparatus for automatically qualifying signal reproduction devices such as television receivers for installation of monitoring equipment.

It is another object of the invention to minimize the number of sophisticated monitoring devices required for determining television viewing habits in a household.

It is still another object of the invention to provide a convenient method for determining when monitoring equipment should be installed or removed.

SUMMARY OF THE INVENTION

In accordance with one aspect of the present invention, the foregoing objects are met by provision of a method of and system for automatically qualifying a signal reproduction device for installation of monitoring equipment in association therewith, including the steps of automatically sensing when the signal reproduction device is in use, producing data representing a usage amount of the signal reproduction device, and determining whether the signal reproduction device satisfies a predetermined qualification criterion for utilization of the monitoring equipment based upon the data representing the usage amount.

According to a further aspect of the invention, the step of and means for determining includes determining whether said data indicates usage of the signal reproduction device in excess of a predetermined minimum usage criterion. In accordance with another aspect of the invention, the step of and means for producing data includes producing data representing times at which the signal reproduction device is in the use.

According to still a further aspect of the invention, the step of and means for determining includes determining whether the data indicates that usage of the signal reproduction device satisfies a predetermined usage pattern.

According to another aspect of the invention, the method and system include the step of and means for producing a qualification signal indicating whether the signal reproduction device satisfies the predetermined qualification criterion.

According to a further aspect of the invention, the method also includes installing, in association with the signal reproduction device, monitoring equipment including means for monitoring at least one of a source of a signal reproduced by the signal reproduction device and the audience using the signal reproduction device, only if the signal reproduction device satisfies the predetermined qualification criterion. According to a further aspect of the invention, the step of installing the monitoring equipment includes installing the monitoring equipment for monitoring usage of a television receiver.

According to yet another aspect of the invention, the step of carrying out the determination is performed at a centralized data processing facility, the steps of sensing use of the signal reproduction device and producing data are carried out at a location remote from the centralized data processing facility and the method further includes transmitting the data from the remote location to the centralized data processing facility. According to yet another aspect of the invention, the produced data is stored at the remote location prior to transmitting the data.

According to still another aspect of the invention, the sensing of when the signal reproduction device is in use includes sensing the use with a usage sensing device which has a receptacle into which is plugged a power cord of the signal reproduction device and the method further includes transmitting the data over domestic AC power supply lines via an AC receptacle into which the usage sensing device is plugged. According to an alternative aspect of the invention, the method includes transmitting the data over a hardwired signal path to which the usage sensing device is connected.

According to still another aspect of the invention, the means for determining includes a centralized data processing facility and there is provided at the centralized data processing facility means for generating a report concerning the signal reproduction device if the signal reproduction device satisfies the predetermined qualification criterion.

According to still another aspect of the invention, the means for sensing includes a usage sensing device which has receptacle means for coupling with a power cord of the signal reproduction device and means for securing the power cord within the receptacle means so that the signal reproduction device can be powered only via the usage sensing device.

In accordance with another aspect of the invention, a method of monitoring usage of a signal reproduction device includes the steps of automatically sensing by means of a usage sensing device when the signal reproduction device is in use, producing data representing usage of the signal reproduction device, and comparing the data with information concerning usage of the signal reproduction device provided from a source other than the usage sensing device. According to alternative aspects of the method, the other source may be a diary maintained by a member of an audience using the signal reproduction device or monitoring equipment installed in association with the signal reproduction device, where the monitoring equipment includes means for monitoring at least one of a source of a signal reproduced by the signal reproduction device and the audience using the signal reproduction device.

Provision of a relatively simple and inexpensive device for sensing when a television receiver (for instance) is in use, but lacking the channel detection and/or audience monitoring capabilities of more complicated monitoring devices, allows a little-used television set to be monitored inexpensively.

It is not intended that the invention be summarized here in its entirety. Rather, further features, aspects and advantages of the invention will be set forth in or apparent from the following description and drawings.

DETAILED DESCRIPTION OF THE PREFERRED EMBODIMENTS

Figure 1:
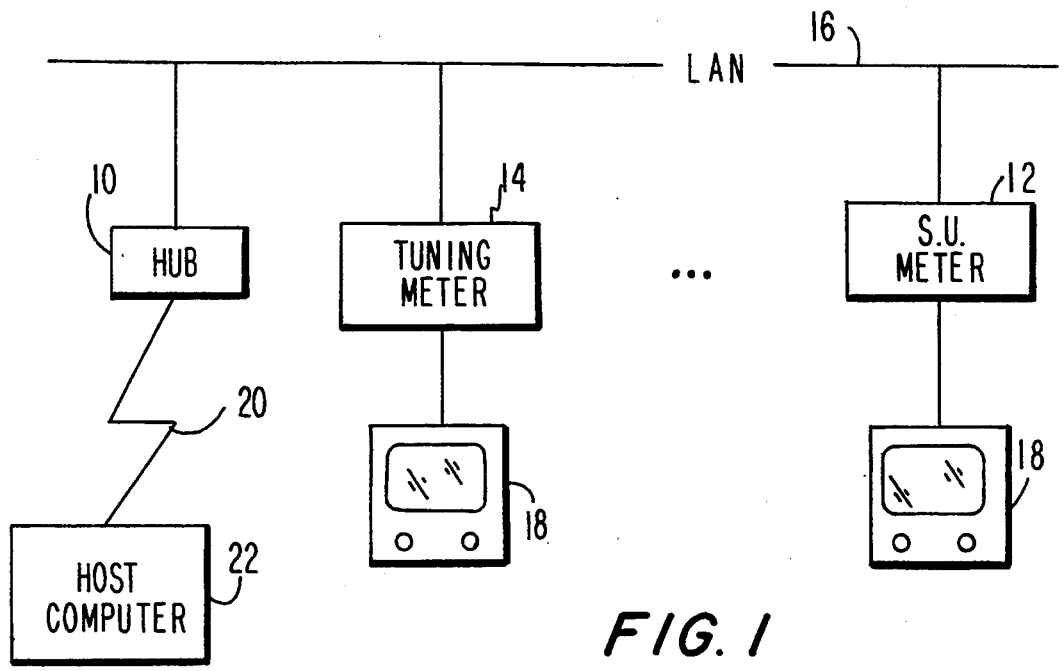
FIG. 1 is a schematic illustration of a typical household in which a set usage meter is installed in proximity to a little-used television receiver.

FIG. 1 schematically illustrates a typical installation of television monitoring equipment, in accordance with the invention, in a household that has more than one television set. The installation includes hub unit 10 for managing transmission of set usage data to a central source. Hub unit 10 may be, for example, of the type disclosed in U.S. Pat. No. 4,912,552 issued to Allison et al.

In addition to hub unit 10, the installation includes one or more set usage meters 12 and one or more tuning people meters 14. Tuning people meters 14 may be, for example, devices of the type disclosed in U.S. Pat. No. 4,816,904 to McKenna et al., which serve both to determine the channel selected for viewing by a television receiver as well as the composition of the audience. The set usage meters 12 and the tuning people meters 14 are connected for data communication with hub unit 10 through a local area network (LAN) 16. In a preferred embodiment of the invention, the local area network communication link is provided through suitable communication modules connected to the household electric wiring.

Alternatively, some or all of the communication link connecting the hub unit 10, the set usage meters 12 and the tuning meters 14 may be formed by a hardwired signal path that is separate from the household electric wiring, or by wireless communication such as infra-red or radio frequency.

Each set usage meter 12 and tuning people meter 14 is associated with a television set 18 which it monitors. In general, the television sets 18 with which set usage meters 12 are associated are expected to receive little or no usage, whereas the television sets 18 with which tuning people meters 14 are associated are expected to receive substantial usage. Data communication between hub 10 and tuning people meters 14 may be carried out, for example, in the manner described in the above-referenced U.S. Pat. No. 4,912,552.

Hub unit 10 is arranged to communicate over a communications channel 20 with a host computer 22 located at a central location, again in a manner that may be as disclosed in U.S. Pat. No. 4,912,552.

Figure 2:
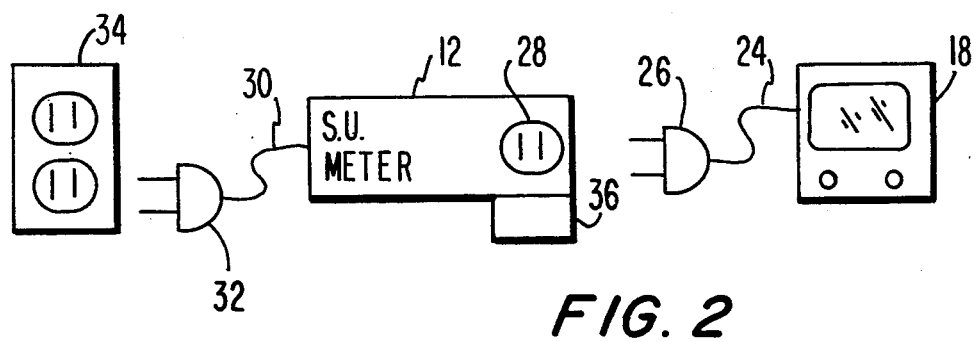
FIG. 2 is a schematic illustration of coupling of a little-used television receiver to the household electrical system via a set usage meter.

FIG. 2 shows additional details concerning the manner of installing a set usage meter 12 with a little-used television set 18.

The set 18 shown in FIG. 2 has a conventional power cord 24 terminating in a plug 26. Set usage meter 12 has a receptacle 28 and a power cord 30 which terminates in a plug 32. The plug 32 of set usage meter 12 is adapted to be plugged into standard household electrical outlets, whereas receptacle 28 of set usage meter 12 is adapted for receiving plugs designed to fit standard household electrical outlets. When it is determined, for example by interviews with household members, or by another method to be described below, that a particular television set 18 is not likely to receive much use, a set usage meter 12 is installed with its plug 32 plugged into a household electric outlet 34 and with the power plug 26 of the particular television set 18 plugged into receptacle 28 of the set usage meter 12. According to a preferred embodiment of the invention, set usage meter 12 includes a lock device 36 which secures the power plug 26 of television set 18 in the receptacle 28 so that the television set 18 can only be powered through set usage meter 12. Such a lock device 36 is well known and need not be further described.

Figure 3:
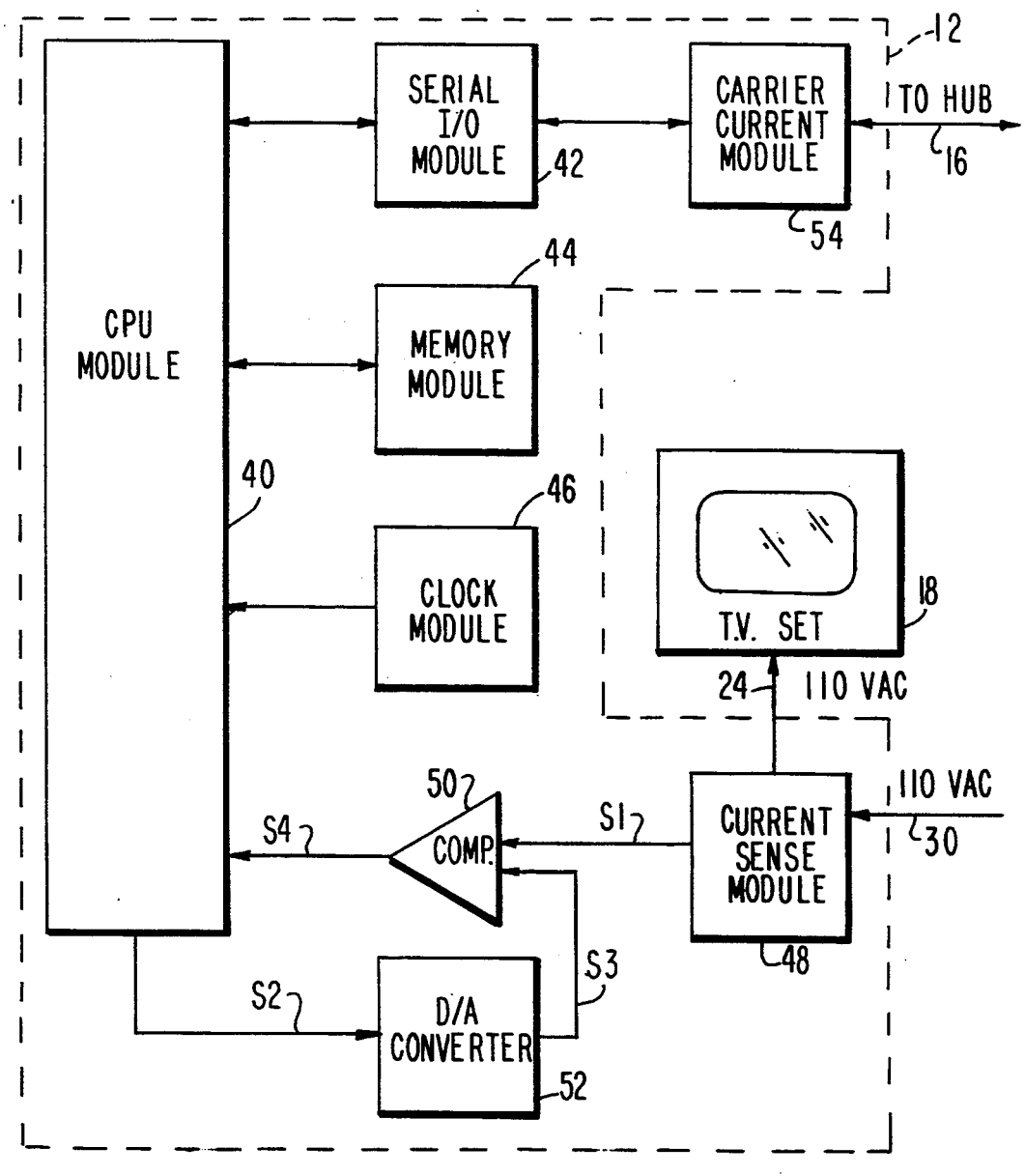
FIG. 3 is a block diagram of a set usage meter installed in proximity to a television set.

The construction of one embodiment of a set usage meter 12 in accordance with this invention will be described with reference to FIG. 3. Set usage meter 12 includes a CPU 40 connected for two-way data communication with, respectively, an input/output module 42 and a memory module 44. CPU 40 is preferably a conventional microprocessor, while I/O module 42 is preferably a conventional device for providing serial data communication between CPU 40 and devices external to set usage meter 12. Memory module 44 preferably includes conventional addressable memory devices such as a working RAM and a program storage memory such as a ROM or an EEPROM. Although modules 40, 42 and 44 are shown functionally as separate on FIG. 3, it will be appreciated that all three functions may be integrated into a single chip of the type incorporating together a microprocessor, I/O capability and onboard memory.

A clock module 46 is also included in set usage meter 12 and provides to CPU 40 a signal indicative of the then present date and time. Set usage meter 12 also includes a current sense module 48 which receives the household power current over a suitable connection (such as power cord 30) and through which the domestic power is supplied to T.V. set 18 via a suitable connection (such as power cord 24).

Also included in set usage meter 12 is a comparator 50 which receives a signal S1 that is output from current sense module 48. The output signal S1 from current sense module 48 is an analog voltage level that is proportional to the amount of current drawn by T.V. set 18 through current sense module 48.

CPU module 40 outputs a digital signal S2 to a digital-to-analog converter 52. The digital signal S2 is converted by D/A converter 52 into an analog threshold level S3 which is supplied to comparator 50. Comparator 50 compares the signal S1 output by current sense module 48 with the threshold level S3 output from D/A converter 52 and in turn outputs a binary signal S4 that is "high" or "low" depending on the outcome of the comparison. Signal S4 is received by CPU 40.

Data communication between set usage meter 12 (i.e. CPU 40) and hub unit 10 occurs by way of local area network 16 and a carrier current module 54 that is connected to serial I/O module 42. Although LAN 16 and power supply path 30 are shown as functionally separate in FIG. 3, it should be recognized that, in an advantageous embodiment, the physical connection with LAN 16 is made through power cord 30. Communication over LAN 16 by other types of data link, including wireless communication, is also contemplated.

Installation and use of a set usage meter 12 in accordance with the present invention will now be described.

As noted above, if it is determined that a particular television set 18 is likely to receive little use, that set is plugged into a set usage meter 12 and the set usage meter 12, in turn, is plugged into a household electrical outlet.

Because many television sets now include an "instant on" feature which causes the television set to draw a certain amount of current even when it is "off" (i.e. not receiving and reproducing a television signal and with the screen dark), an appropriate threshold level for distinguishing between "on" and "off" states of the television set 18 must be stored in set usage meter 12. The threshold level may be a preset value or may be set during a procedure carried out at the time of installation.

If a threshold-setting procedure is used, an installation and test device ("ITD"), which is made up of a suitably programmed lap-top computer and interface circuitry, is used for controlling the threshold-setting procedure. At the time of installation, the ITD (not shown for purposes of simplicity and clarity) is interfaced by the installer to CPU module 40, via serial I/O module 42 and hub 10. The installer uses the ITD to send a signal to CPU module 40 to start the threshold-setting procedure. When the CPU module 40 is ready to proceed, it signals the ITD, which prompts the installer to turn off the particular TV set 18 with which the set usage meter is to be installed. When this has been done, the installer signals to CPU module 40 via the ITD. CPU module 40 then operates to adjust the digital threshold level S2 through a range of values, until it is determined at what value within that range the output signal S4 of comparator 50 changes state. CPU module 40 takes that value of the signal S2 as corresponding to an analog level S3 which is equal to the output signal S1 of the current sense module 48 which reflects the "off" current drawn by T.V. set 18. The CPU module 40 then signals the ITD, which prompts the installer to turn on T.V. set 18. After doing so, the installer again signals the CPU module 40 via the ITD. The CPU module 40 then operates again to adjust the signal S2 through a range of values until a value corresponding to the "on" current is found. A threshold level for S2 is then calculated by CPU module 40 as the mean of the "on" and "off" values and this threshold level is stored and subsequently, during operation of set usage meter 10, is converted by D/A converter 52 into the analog threshold S3 with which the output S1 of current sense module 58 will be compared for the purpose of detecting whether the T.V. set 18 is on or off.

Upon completion of threshold-setting, an appropriate signal is sent by CPU module 40 to the ITD and the ITD displays a prompt so that the ITD is removed from communication with set usage meter 12.

It should be noted that there are a number of possible alternatives to current-sensing for the purpose of on/off detection. For example, a probe implanted within T.V. set 18, or an external sensor installed nearby, could be used for detecting RF radiation from the tuner of T.V. set 18. The radiation to be sensed could be, for example, the carrier frequency of the local oscillator or the horizontal or vertical synchronization signals. As another alternative, either an internal probe or an external sensor could sense radiation from the electron gun of T.V. set 18. Moreover, external sensors could be used for sensing the light output of the picture tube or the audible output of the speakers. Another alternative is for the on/off sensor to receive its input via a plug inserted into an audio or video output jack of T.V. set 18. Still another possible source of an input signal for on/off detection is an internal probe which picks up activity of the flyback transformer of T.V. 18.

In an advantageous embodiment of set usage meter 12, CPU 40 operates to record data indicating times when the on-or-off state of the T.V. set 18 changes. It also serves to transmit this data to hub 10 through modules 42 and 54 in response to requests therefor received from hub 10.

Additional details of the operation of set usage meter 12 will be described with reference FIG. 4, which illustrates a loop routine that controls the normal operation of set usage meter 12. After the set usage meter 12 has been properly installed and initialized as described above, a first step in the loop routine is a decision block 100. If at decision block 100 no polling request was found to have been received from hub 10, decision block 102 follows, at which it is determined whether it is time to check the on-or-off status of the T.V. set 18. Preferably CPU 40 monitors the status of T.V. set 18 at intervals of, for example, a few seconds. If it is determined at decision block 102 that it is not time to check the status of T.V. 18, then the routine loops back to decision block 100. However, if at decision block 102 it is determined that it is time to check the status of T.V. set 18, the CPU module 40 determines whether the on-or-off status has changed by, for example, comparing the state of the signal S4 output by comparator 50 with the most recent data entry logged by CPU module 40 with respect to the status of T.V. set 18. If it is determined at decision block 104 that there has been no change in the T.V.'s status, then the routine simply loops back to decision block 100. Otherwise, process step 106 follows decision block 104.

In process step 106, CPU module 40 causes there to be stored in memory module 44 a data entry indicating the present time and date and the new status of the T.V. set 18. It will therefore by appreciated that a series of data entries in such form as "time 1, on"; "time 2, off"; "time 3, on" and so forth will be stored in memory module 44, with "time 1", "time 2" and so forth representing respective dates and times at which the status of T.V. 18 changed, i.e. dates and times at which the set was turned on or off. On completion of process step 106, the routine loops back to decision block 100.

Let it now be assumed that, at decision block 100, it is determined that a polling request has been received from hub 10. In that case a process step 108 follows decision block 100. At process step 108, CPU 40 transmits to hub 10 via LAN 16 the data stored in memory module 44 concerning the changes in the on-or-off state of T.V. set 18 or data representative thereof. The data transmittal to hub 10 may also include data that identifies the particular set usage meter 12. After transmission of that data to hub 10, the data in memory 44 with respect to the T.V. set's changes in status may be cleared, or alternatively may be stored as "archival" for a period of time. Upon completion of process step 108, the routine then proceeds to decision block 102, which has previously been described.

Figure 4:
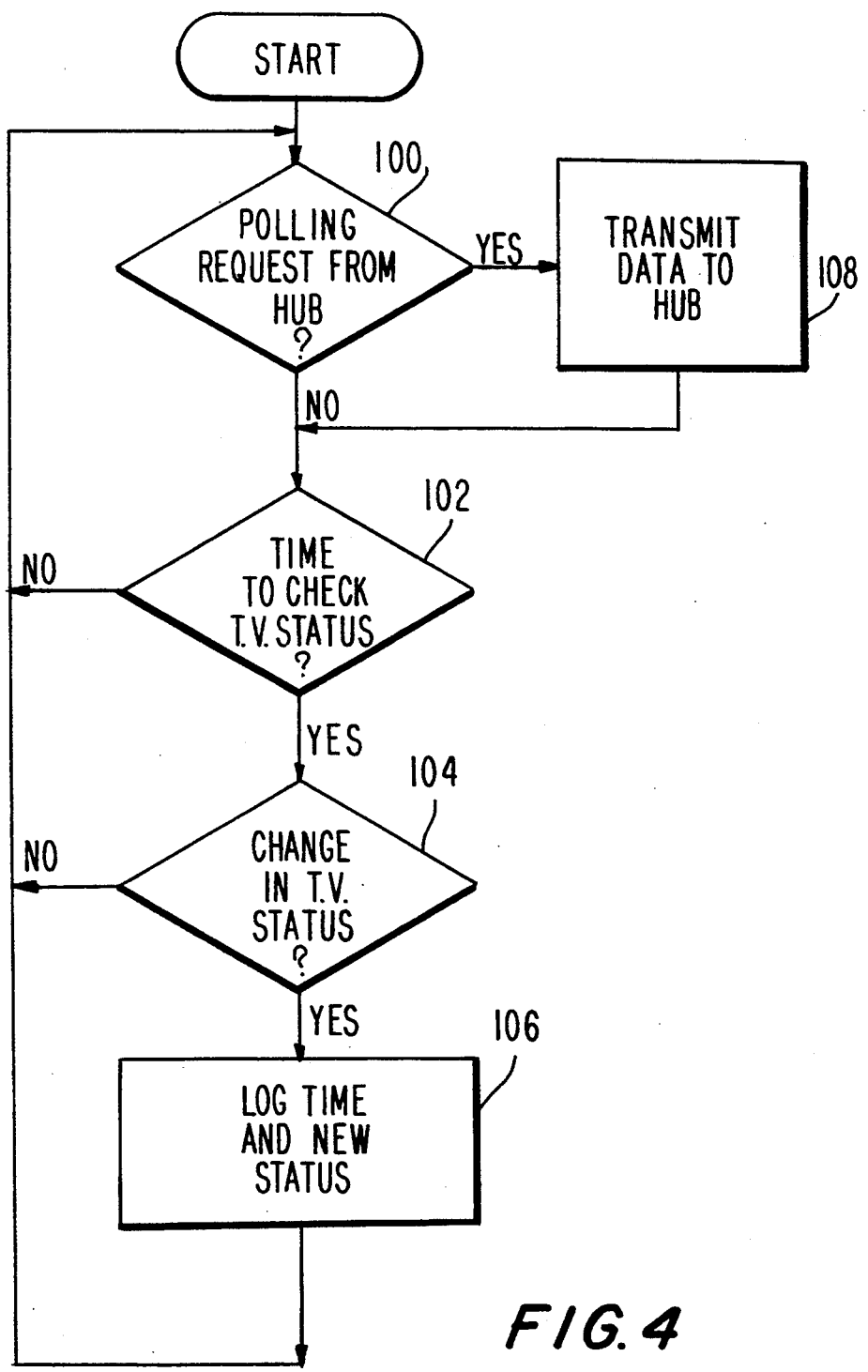
FIG. 4 is a flow chart that illustrates a software routine for controlling the operations of the set usage meter of FIG. 3.

Although the routine of FIG. 4 has been indicated as an endless loop, it will be understood that CPU 40 may be programmed so that certain events, such as unplugging of set usage meter 12 from electrical outlet 34 or other interruption of power to set usage meter 12, or interfacing of an installation or test device to set usage meter 12, will interrupt the looping routine of FIG. 4.

It should also be understood that the set usage meter 12 may include a backup power supply, such as a battery (not shown for purposes of simplicity and clarity) and may be programmed to transmit a predetermined signal to hub 10 in the event that the household AC power is interrupted.

Polling and data gathering operations of hub 10 with respect to set usage meter 12 and other meter devices connected to LAN 16 are preferably of the sort described in the above referenced U.S. Pat. No. 4,912,552, and so need not be described in detail. Moreover, transmittal of data from hub 10 to host computer 22, including data gathered through set usage meter 12 and data identifying the particular T.V. set 18, is carried out in a manner described in the patent referenced above and so, again, need not be described.

At host computer 22 the data gathered through set usage meter 12 may be handled in a number of ways. For example, that data may simply be stored in host computer 22. Alternatively, a report including the data may be generated for review by a supervisor or operator. Of course, the generated report may be reviewed in the form of a hard copy printed by the computer 22 or via a computer display (not shown). Further, the times when the T.V. set 18 associated with set usage meter 12 was in operation may be calculated by host computer 22 on the basis of the data received and the calculated times may then be compared with a minimum usage threshold by host computer 22 and if the times of operation exceed the threshold, then data identifying the particular T.V. set 18 may be printed out in a report, stored, viewed on a display, etc. Alternatively, a human operator may review data generated by the host computer, compare or calculate and compare the times of usage of the T.V. set with a threshold amount and then direct that a tuning meter be installed in association with the T.V. set 18.

In determining whether to install a tuning meter, the T.V. set's usage pattern may be considered in addition to or instead of the total amount of usage. For example, if particular hours of the day are of special interest, then a T.V. set that is regularly or frequently used during those hours, but used little or not at all at other times, may still have a tuning meter installed based on the data provided by the set usage meter.

The data provided by set usage meters can be used for other purposes in addition to deciding whether a T.V. set should have a tuning meter installed therewith. One such other purpose is the comparison of the data from the set usage meter with data provided by other sources. For example, in a market research project in which viewers are asked to keep a diary of television viewing habits, the reliability of the diary entries can be appraised by comparison with the data from the set usage meter. As another example, even when a tuning meter is used for monitoring the T.V. set, the data from the set usage meter can be used as backup information to confirm that the tuning meter is operating properly.

It will therefore be seen that a relatively simple and inexpensive set usage meter, in accordance with the invention, can be used to automatically and conveniently confirm that a supposedly little-used television set is in fact receiving little use, or, if such is not the case, to arrange for installation of a tuning meter, a tuning people meter, or the like, with respect to that television set. At the same time, so long as the particular television set remains in disuse, a tuning meter or tuning people meter need not be provided, resulting in a smaller installed base of relatively expensive meters, with an accompanying savings in fixed capital and operating costs.

Moreover, the data provided by a set usage meter can be valuable in checking the accuracy of data provided by other sources.

In accordance with another embodiment of the invention, a conventional tuning people meter 14 is programmed to report data representing time of usage of its associated T.V. set 18 and that data is gathered and manipulated, in a similar manner to the data gathered through set usage meters 12, for the purpose of determining whether the usage of the T.V. set 18 is sufficient to require continued installation of tuning people meter 14. If such does not prove to be the case, then the tuning people meter 14 can be removed and replaced with a set usage meter 12.

Although the specific embodiments described herein have related to monitoring of television receivers, it may also be desired to monitor usage, including signal source, of other devices such as radio receivers, video monitors, video cassette recorders, tape recorders, CD players, laser disc players, satellite earth stations and the like. Accordingly, the principles of the present invention may be applied to monitoring of all of these types of equipment, which should be understood as being included in the term "signal reproduction device" along with other devices for rendering audible and/or visible a signal transmitted from another location or previously recorded in some form. It will also be noted that a tuning people meter of the type which is capable of determining a channel to which an associated television set is tuned has been given as an example of a meter which is capable of detecting a source of a signal reproduced by the associated signal reproduction device. However, it is also within the contemplation of this invention that detection of the source of the signal reproduced by the signal reproduction device include, for example, detecting identifying data or the like pre-recorded with the signal that is being reproduced. Such pre-recorded data may include, but is not limited to, data identifying a television channel. Further examples of monitoring devices which may be qualified for use in accordance with the present invention include tuning meters and people meters which separately perform their respective functions.

It will be appreciated that various functions carried out by the present invention may be implemented by hardwired circuitry or software, and that such functions may also be carried out either by analog or digital techniques or a combination thereof.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of automatically qualifying a signal reproduction device located at a remote location for installation of monitoring equipment in association therewith, comprising the steps of:
   automatically sensing, at said remote location, when said signal reproduction device is in use;
   producing data, at said remote location, representing a usage amount of said signal reproduction device;
   transmitting the data from said remote location to a centralized data processing facility; and
   determining, at said centralized data processing facility, whether said signal reproduction device satisfies a predetermined qualification criterion for utilization of said monitoring equipment based upon said data representing said usage amount.

2. A method according to claim 1; wherein the step of determining comprises determining whether said data indicates usage of the signal reproduction device in excess of a predetermined minimum usage criterion.

3. A method according to claim 1; wherein the step of determining comprises determining whether said data indicates that usage of the signal reproduction device satisfies a predetermined usage pattern.

4. A method according to claim 1; further comprising the step of producing a qualification signal indicating whether said signal reproduction device satisfies said predetermined qualification criterion.

5. A method according to claim 1; further comprising storing the produced data at the remote location prior to transmitting said data.

6. A method according to claim 1; further comprising the step of removing said monitoring equipment if said signal reproduction device fails to satisfy said predetermined qualification criterion.

7. A method according to claim 1; wherein said step of sensing when said signal reproduction device is in use comprises sensing such use with a usage sensing device having a receptacle into which is plugged a power cord of said signal reproduction device.

8. A method according to claim 7; further comprising the step of transmitting said data over domestic AC power supply lines via an AC receptacle into which said usage sensing device is plugged.

9. A method according to claim 7; further comprising the step of transmitting said data over a hardwired signal path to which said usage sensing device is connected.

10. A method of automatically qualifying a signal reproduction device for installation of monitoring equipment in association therewith, comprising the steps of:
    automatically sensing when said signal reproduction device is in use;
    producing data representing times at which said signal reproduction device is in use; and
    determining whether said signal reproduction device satisfies a predetermined qualification criterion for utilization of said monitoring equipment based Upon said data representing said usage amount.

11. A method of automatically qualifying a signal reproduction device for installation of monitoring equipment in association therewith, comprising the steps of:
    automatically sensing when said signal reproduction device is in use;
    producing data representing times at which said signal reproduction device is in use; and
    determining that said signal reproduction device is qualified for installation of monitoring equipment if said times represented by said data exceed a predetermined minimum usage threshold.

12. A method of automatically qualifying a signal reproduction device for installation of monitoring equipment in association therewith, comprising the steps of:
    automatically sensing when said signal reproduction device is in use;
    producing data representing a usage amount of said signal reproduction device;
    determining whether said signal reproduction device satisfies a predetermined qualification criterion for utilization of said monitoring equipment based upon said data representing said usage amount; and
    installing, in association with said signal reproduction device, monitoring equipment including means for monitoring at least one of a source of a signal reproduced by said signal reproduction device and the audience using said signal reproduction device, only if said signal reproduction device satisfies said predetermined qualification criterion.

13. A method according to claim 12; wherein the step of installing monitoring equipment comprises installing said monitoring equipment for monitoring usage of a television receiver.

14. A system for automatically qualifying a signal reproduction device located at a remote location for installation of monitoring equipment in association therewith, comprising:
    a usage sensing device installed in association with said signal reproduction device at said remote location for automatically sensing when said signal reproduction device is in use;
    means for producing data representing a usage amount of said signal reproduction device;
    a centralized data processing facility for determining whether said signal reproduction device satisfies a predetermined qualification criterion for utilization of said monitoring equipment based upon said data representing said usage amount; and
    means for transmitting the data from said remote location to the centralized data processing facility.

15. A system according to claim 14; wherein said means for determining comprises means for determining whether said data indicates usage of the signal reproduction device in excess of a predetermined minimum usage criterion.

16. A system according to claim 14; wherein said means for determining comprises means for determining whether said data indicates that usage of the signal reproduction device satisfies a predetermined usage pattern.

17. A system according to claim 14; further comprising means for producing a qualification signal indicating whether said signal reproduction device satisfies said predetermined qualification criterion.

18. A system according to claim 14; further comprising means for storing the produced data at the remote location prior to transmitting said data.

19. A system according to claim 18; further comprising a hardwired signal path interconnecting said usage sensing device and said means for storing.

20. A system according to claim 14; further comprising means provided at said centralized data processing facility for generating a report concerning said signal reproduction device if said signal reproduction device satisfies said predetermined qualification criterion.

21. A system according to claim 14; wherein said means for sensing comprises a usage sensing device having receptacle means for coupling with a power cord of said signal reproduction device.

22. A system according to claim 21; wherein said usage sensing device includes means for securing said power cord within said receptacle means so that said signal reproduction device can be powered only via said usage sensing device.

23. A system according to claim 14; wherein said means for sensing comprises a usage sensing device having a power cord which is plugged into an AC receptacle of a domestic power supply.

24. A system according to claim 23; wherein said usage sensing device includes said means for producing data; and further comprising means for transmitting said data over domestic AC power supply lines via said AC receptacle into which said power cord of said usage sensing device is plugged.

25. A system for automatically qualifying a signal reproduction device for installation of monitoring equipment in association therewith, comprising:
means for automatically sensing when said signal reproduction device is in use;
means for producing data representing times at which said signal reproduction device is in use; and
means for determining whether said signal reproduction device satisfies a predetermined qualification criterion for utilization of said monitoring equipment based upon said data representing said usage amount.

26. A method of monitoring usage of a signal reproduction device, comprising the steps of:
automatically sensing by means of a usage sensing device when said signal reproduction device is in use;
producing data representing usage of said signal reproduction device; and
comparing said data with information concerning usage of said signal reproduction device provided from a source other than said usage sensing device.

27. A method according to claim 26; wherein said other source is a diary maintained by a member of an audience using said signal reproduction device.

28. A method according to claim 26; wherein said other source is monitoring equipment installed in association with said signal reproduction device, said monitoring equipment including means for monitoring at least one of a source of a signal reproduced by said signal reproduction device and the audience using said signal reproduction device.

29. A system for automatically qualifying a signal reproduction device for installation of monitoring equipment in association therewith, comprising:
means for automatically sensing when said signal reproduction device is in use;
means for producing data representing times at which said signal reproduction device is in use; and
means for determining whether said signal reproduction device satisfies a predetermined qualification criterion for utilization of said monitoring equipment if said times represented by said data exceed a predetermined minimum usage threshold.

* * * * *